No. 679,254. Patented July 23, 1901.
C. W. CRAMER.
LIQUID DISPENSING AND MEASURING APPARATUS.
(Application filed Sept. 19, 1900.)
(No Model.) 3 Sheets—Sheet 2.
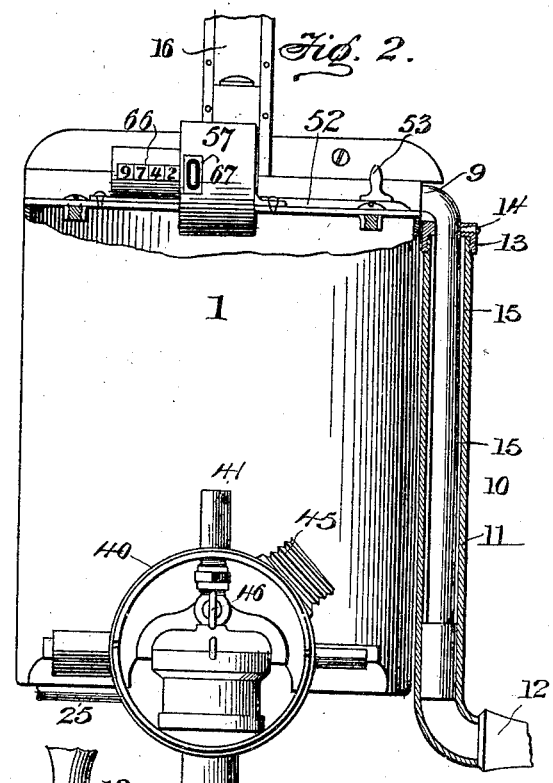
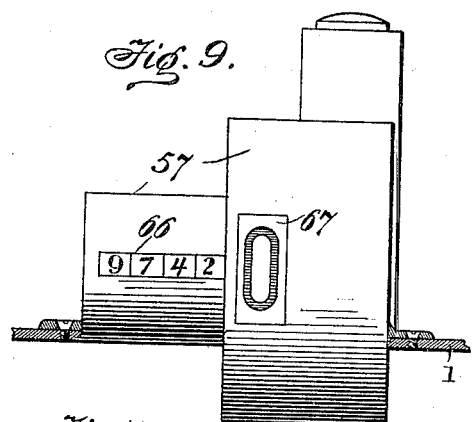
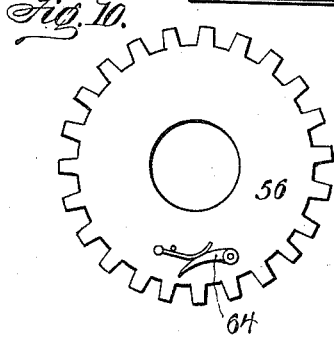
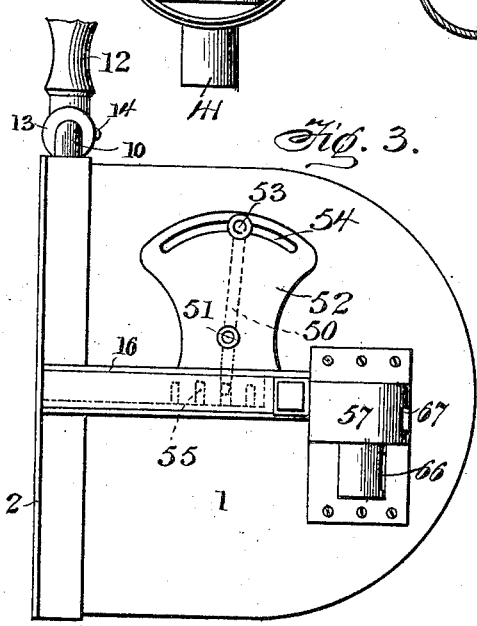
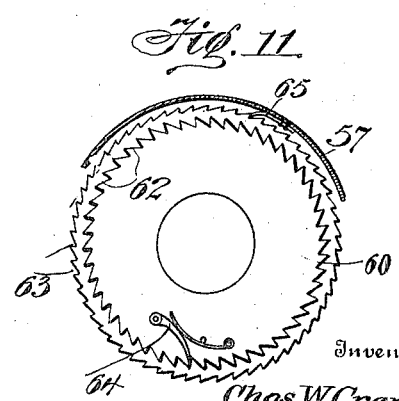
Witnesses
Fenton S. Belt,
Elmer Seavey.
Inventor:
Chas. W. Cramer
By Mason Fenwick & Lawrence
his Attorneys.
THE NORRIS PETERS CO., PHOTO-LITHO., WASHINGTON, D. C.

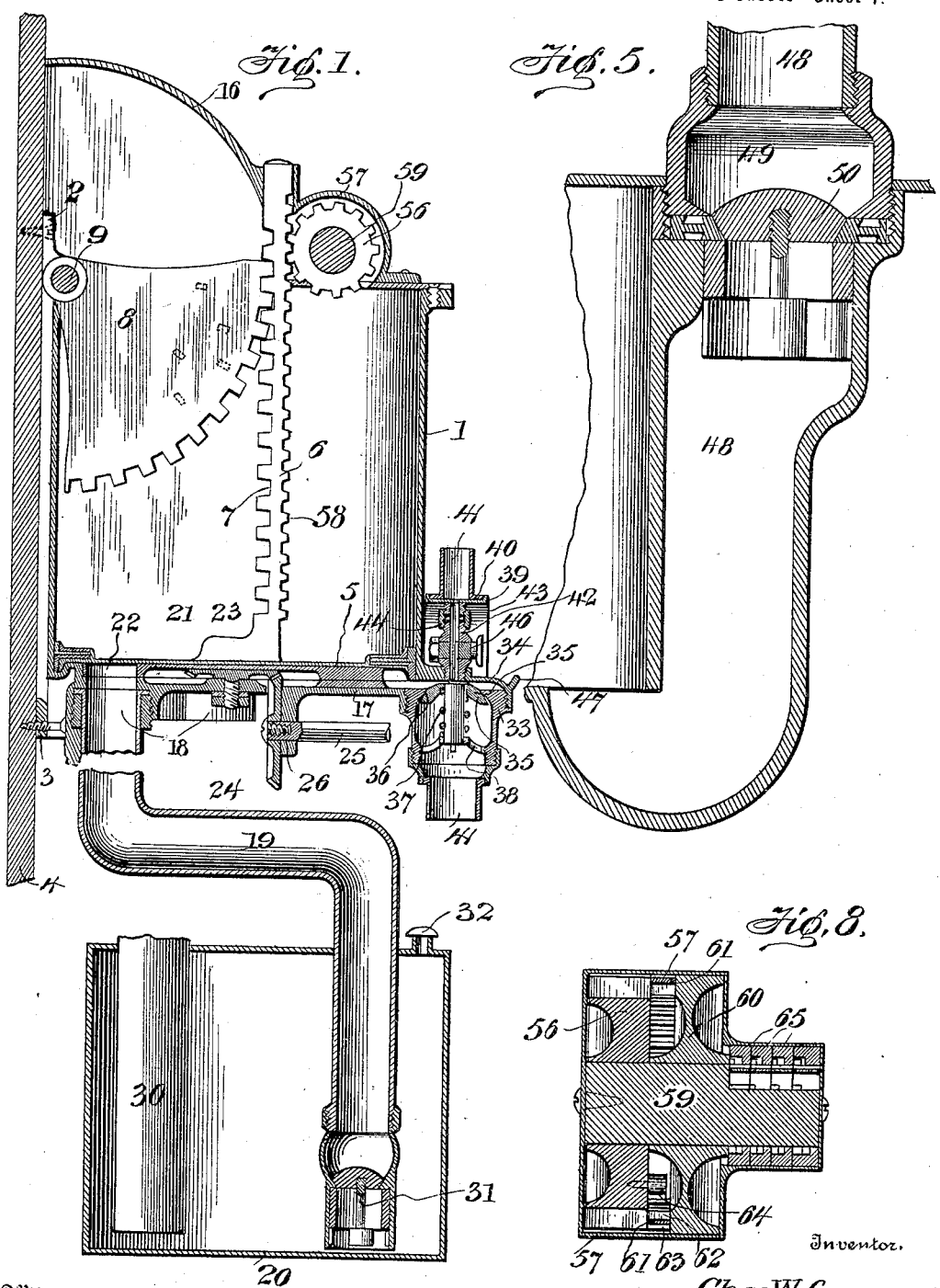

No. 679,254. Patented July 23, 1901.
C. W. CRAMER.
LIQUID DISPENSING AND MEASURING APPARATUS.
(Application filed Sept. 19, 1900.)
(No Model.) 3 Sheets—Sheet 3.

Witnesses
Fenton S Bell,
Elmer Seavey,

Inventor
Chas W. Cramer,
By Mason Fenwick & Lawrence,
his Attorneys.

THE NORRIS PETERS CO., PHOTO-LITHO., WASHINGTON, D. C.

UNITED STATES PATENT OFFICE.

CHARLES W. CRAMER, OF SCRANTON, PENNSYLVANIA.

LIQUID DISPENSING AND MEASURING APPARATUS.

SPECIFICATION forming part of Letters Patent No. 679,254, dated July 23, 1901.

Application filed September 19, 1900. Serial No. 30,515. (No model.)

*To all whom it may concern:*

Be it known that I, CHARLES W. CRAMER, a citizen of the United States, residing at Scranton, in the county of Lackawanna and State of Pennsylvania, have invented certain new and useful Improvements in Liquid Dispensing and Measuring Apparatus; and I do hereby declare the following to be a full, clear, and exact description of the invention, such as will enable others skilled in the art to which it appertains to make and use the same.

My invention relates to pumps designed for use in pumping liquids from vessels or tanks and measuring the amount of liquid pumped.

The object of the invention is to provide an improved pump of this class embodying in its construction means for regulating the amount of liquid pumped, means for pumping liquid from any one of a plurality of tanks, and means for discharging liquid in streams of various sizes.

With these objects in view the invention consists in the improved construction, arrangement, and combination of parts hereinafter fully described and afterward specifically claimed.

Figure 4:
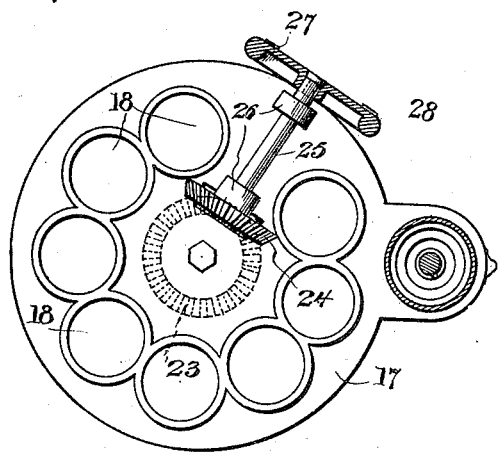
Figure 12:
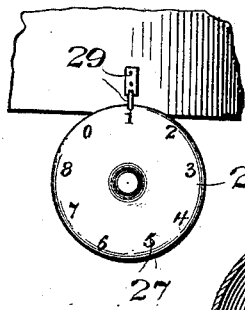
Figure 6:
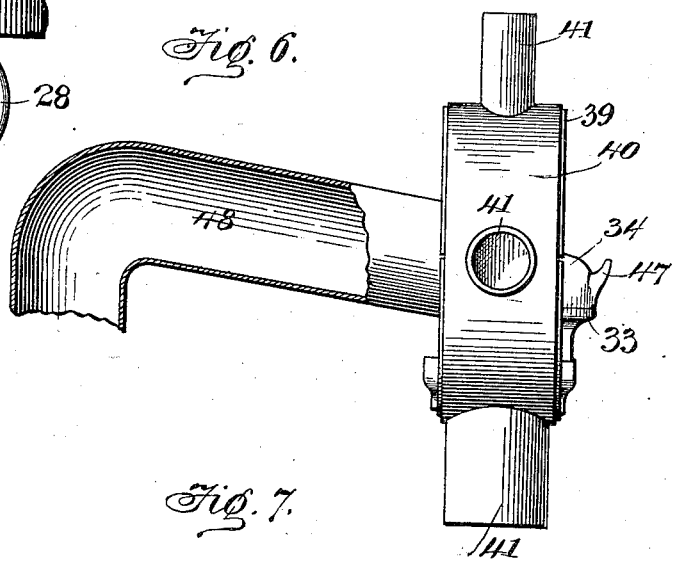
Figure 7:
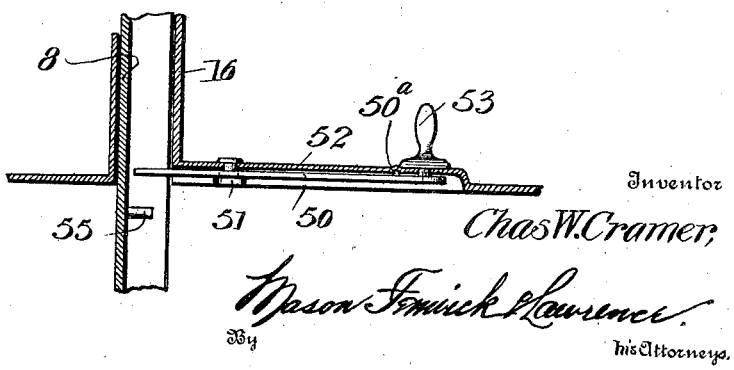

In the accompanying drawings, Figure 1 represents a vertical longitudinal section through a measuring-pump constructed in accordance with the present invention. Fig. 2 represents a front elevation of the same, portions being broken away and shown in section. Fig. 3 represents a top plan view of the pump. Fig. 4 represents a bottom plan view of the pump-cylinder; Fig. 5, an enlarged detail view through a portion of a pump-cylinder and an outlet-valve arranged in an upwardly-extending discharge-pipe. Fig. 6 represents a detail view showing the delivery end of the discharge-pipe illustrated in Fig. 5 and illustrating the manner in which the revoluble nozzle can be applied to the same. Fig. 7 represents a detail sectional view through the top of the cylinder, showing the means for controlling the amount of liquid which shall be pumped. Fig. 8 is a vertical central section through the registering mechanism. Fig. 9 is a front elevation of the same. Fig. 10 is a detail view in elevation of one of the gear-wheels in the said register. Fig. 11 is a detail fragmentary view of a portion of the registering mechanism, showing the ratchet-wheel employed therein; and Fig. 12 is a detail view showing the wheel for operating the revoluble plate or disk in the bottom of the pump-cylinder and illustrating the indication-marks thereon.

In embodying these features into practical form I form the pump with a cylinder 1, which is preferably provided with attaching lugs or flanges 2 2, so that it may be screwed or bolted to any suitable support, as 4. Within the cylinder 1 is arranged a piston, as 5, which is carried by the lower end of a reciprocating piston-rod 6. The piston-rod 6 is designed to pass through an opening in the cover of the cylinder and is provided upon one side with a series of grate-teeth, forming a rack, as at 7, adapted to engage with the gear-teeth of a segment 8. The segment 8 is rigidly secured to an operating rock-shaft 9, which finds suitable bearings in the top of the cylinder 1. The rock-shaft extends outside the bearings and is bent to form part of a crank-arm, as at 10. The other portion of the crank-arm is formed by an inclosing sleeve 11, which telescopes upon the end of the arm 10 and is bent at its outer end and provided with an operating-handle 12. The sleeve 11 is provided with a head, as at 13, which fits upon the arm 10 and is rigidly secured to the sleeve 11. A set-screw, as 14, adapted to extend through the collar 13 and engage notches, as at 15 15, formed in the arm 10, permits the said crank-arm to be adjusted to different lengths. By this means a greater or less power may be applied to the pumping mechanism, as found desirable, the leverage being increased or diminished by the adjustment of the sleeve 11. The segment 8 preferably travels in the casing 16, arranged upon the cover of the pump, so that no foreign substance or dirt can get into the pump-cylinder. The base or bottom plate 17 of the pump-cylinder 1 is formed with a series of openings, as at 18 18, which are adapted to be connected by as many suction-pipes 19 19 with a number of supply-tanks, as 20. The supply-tanks 20 may be arranged at any desired distance from the pump—as, for instance, in handling inflammable liquids the tank may be placed in the ground outside of a house or store and be connected with the pump by a suction-pipe 19, so that the liquid will not have to be stored in the building, but can be pumped and measured whenever desired. The suction-pipes of course can be led in different directions to different tanks. The suction-pipes are secured tightly at their ends to openings formed in the bottom plate 17 of the pump. Immediately inside the bottom plate 17 and tightly mounted thereon is a revoluble plate 21, which is adapted to move over the said bottom plate, but in snug contact therewith. This plate or disk 21 is provided with a single opening, as at 22, which is of a suitable size to register with the openings in the base or bottom plate 17. By turning this plate so that its opening 22 is brought over the suction-pipe which leads to the receptacle containing the desired fluid the pump will operate to draw the liquid only from that particular tank. When it is desired to draw liquid from another tank, the plate is turned so that the opening 22 will coincide with its suction-pipe. By this construction the same pump can be used for drawing liquids from any one or a number of tanks and can be quickly connected with any of them. In order to actuate the said revoluble plate 21, I form a bevel-gear, as 23, on the under face of the same and so arrange it as to mesh with a bevel-gear 24, carried by a shaft 25 outside the pump. The shaft 25 finds suitable bearings, as at 26, in lugs or projections formed upon the base-plate 17 of the pump. The outer end of the shaft 25 projects slightly beyond the pump-cylinder 1 and is provided with an operating-wheel 27, so arranged as to be easily turned by hand. By this structure the inner revolving plate 21 can be readily turned at any time. This hand operating-wheel 27 is preferably provided upon its outer face with marks or projections, as at 28, which may be arranged to coincide with a corresponding pointer or mark 29, formed upon the side of the pump. By this arrangement the position of the revolving plate 21 inside the can can always be determined, and by bringing a certain number upon the wheel 27 opposite the projection or pointer 29 on the cylinder the opening 22 can be arranged opposite the mouth of the suction-pipe corresponding with said number. The tanks are preferably closed and are provided with suitable inlet-pipes, as at 30, by which they may be filled at any time. The suction-pipes 19 extend preferably to a point near the bottom of the tanks and may be provided with any suitable valve, as at 31, for preventing a backflow of the liquid from the said pipes into the tank. It is desirable oftentimes to make these tanks quite snugly closed, and in this instance it is necessary to provide an air-inlet valve, as at 32, of any suitable construction, so that when liquid is drawn from the tank all tendency to a vacuum therein will be avoided and the pumping operation will not be retarded.

In connection with the pump thus described, the manner of mounting and forming the delivery-nozzle for the same forms an important feature of the present invention. The nozzle is usually formed, as illustrated in Fig. 1 of the drawings, so as to project slightly to one side of the said cylinder. The nozzle casing or casting, as 33, is preferably screw-threaded at its upper edge and fits into the corresponding screw-threaded opening formed in the projecting portion 34 on the cylinder. Mounted in the casing 33 is a valve, as 35, adapted to control the outlet-opening and to prevent any back suction either of air or liquid through the opening which it closes. This valve is therefore seated, as at 36, upon an opening, which is beveled outwardly and is held against the said seat by means of a spring, as 37, which surrounds the stem of the valve, the said stem being preferably guided by a spider, as at 38, arranged within the casing 33. This nozzle is also provided with a circular track or guideway, as at 39, which extends entirely around the casing and is adapted to engage a revoluble ring 40. The ring 40 is provided with a series of discharge-nozzles, as 41 41. These nozzles are arranged at different points upon the ring, and by turning the ring upon the guideway 39 any one of the nozzles may be brought opposite the discharge-opening of the casing 33. These nozzles may be made of different sizes or diameters, so that when a large receptacle is to be filled a large nozzle may be used for more quickly discharging the fluid or liquid, and when a receptacle having a smaller opening or inlet is to be filled a smaller nozzle may be employed for concentrating the liquid in a smaller stream. In using such a ring as just described it is necessary of course to bind the same snugly against the casing 33, so that there will be no leakage between the said casing and the nozzle used. For this purpose I form an extension, as at 42, upon the upper side of the casing 33 between the same and the ring 40. Upon the ring and extending toward the projection 42 is a smaller or shorter projection, as 43. The ends of these projections do not quite meet and are provided with screw-threads upon their outer surfaces for the short distances which are adapted to be engaged by a sleeve, as 44. The threads of the opposing projections are oppositely arranged, and the sleeve 44 is provided upon its inner surface with oppositely-arranged threads on each end thereof for engaging the threads on the said projections. By turning the sleeve the ring 40 may be forced upwardly away from the casing at its upper portion, which will operate to draw its lower portion against the open end of the nozzle. The ring may then be turned to bring any one of the delivery-spouts opposite to the said opening. The said sleeve may be tightened at any time should any of the spouts leak, but is sufficiently loose to permit of the turning of said ring. Any one or more of the nozzles may be provided with external screw-threads, as at 45, if desired, so that the nozzle may be connected with suitable piping for delivering the liquid at a greater distance from the pump. An important feature of my improved nozzle also is means supplied for cleaning the same. The projections 42 and 43 are preferably made hollow, and a cock or valve, as 46, is placed in the projection 42, so as to control the passage-way throught to it. This cock 46 is normally kept closed, so that the suction of the pump for drawing liquids from the suction-pipes 19 is not destroyed. When it is desired to clean out the chamber of the valve within the nozzle, the cock 46 is opened and the pump-piston being raised at such a time will draw air in through the openings in the extensions 42 and 43 and draw the same into the pump-cylinder as instead of drawing liquids from the suction-pipes 19. After the pump-cylinder has thus been filled by air by closing the cock 46 and depressing the piston the air may be forced through the valve-chamber past the valve and out the nozzle, so as to thoroughly clean the same and rid it of any liquids. The nozzle-casing 33 may be provided with a projection or hook, as at 47, if desired, upon which buckets or other handled receptacles may be hung for receiving the liquid discharged.

As seen in Fig. 5 of the drawings, it is sometimes desirable to carry the discharge or delivery spout upwardly above the pump-cylinder. In this instance the delivery-spout 48 preferably extends upwardly outside the pump-cylinder, and a valve-chamber is formed, as at 49, with a suitable valve 50 mounted therein, adapted to perform the same function as the valve 35, heretofore described. In this arrangement of the device it is necessary to modify the direction of the spout 48, so that the revolving nozzle may be placed thereon. This is illustrated in Fig. 6 of the drawings, where it will be seen the delivery-spout is turned outwardly from the pump and carries at its outer end the nozzle-chamber 33 and the nozzle-ring 40, as before described and illustrated. In order to measure the amount of liquid pumped, I provide a device upon the top of the pump-cylinder 1 which is adapted to engage a segment 8 and control the amount of its movement. This device comprises a lever 50, pivoted to a suitable stud 51 upon the cover of the pump. This lever is preferably covered by a casing 52, formed by a raised portion off the cover of the pump. The lever 50 is thus protected from being clogged by the accumulation of dirt or other foreign substances. The other end of the lever is provided with an operating-handle 53, which extends outside the casing 52, the lower end of the said handle traveling in a curved slot, as 54, formed in the said casing. The inner end of the lever 50 projects into the casing 16 and is adapted to be arranged in the path of a series of lugs or stops 55, secured to one face of the segment 8. These lugs 55 are arranged in different radial distances from the axis of the shaft 9, so that when the lever 50 is moved into the path of one of said lugs it will not be in the path of any of the others and will not come into contact with any of the others. These lugs are also arranged at different distances from one end of the curved rack formed on the segment 8, so that they will permit the said rack to be moved at certain stated distances, according to the lug which is engaged by the lever 50. It will be seen that the lever 50 can be quickly set to engage the proper lug upon the segment 8, so that any desired quantity of liquid can be pumped by the operation of the pistons 6. To guide the operator of the lever in properly locating the positions of the lever, a stud or pin $50^a$ is secured thereto, which is adapted to engage depressions or recesses on the under surface of the cover and arranged so as to hold the lever opposite the said lugs 55. In connection with the said pump I also desire to employ a registering mechanism for keeping an accurate account of the amount of liquid passing through the pump. For this purpose I arrange upon the cover of the cylinder 1 a simple contrivance comprising a gear-wheel, as 56, arranged within a casing 57 and so located as to have its teeth mesh with rack-teeth 58 upon one side of the piston 6. The gear-wheel 56 is mounted upon a spindle or shaft 59, also arranged in the casing 57, and upon the said shaft to one side of the said gear-wheel 56 is a second wheel 60. This wheel 60 is formed upon its face which is adjacent to the gear-wheel 56 with an annular projection 61. The projection 61 has formed upon its inner periphery a series of ratchet-teeth 62, while upon its outer periphery a second series of ratchet-teeth, as 63, are formed, which are arranged to extend in the same direction as the teeth 62. The inner ratchet-teeth 62 are adapted to be engaged by a spring-controlled pawl 64, carried by a gear-wheel 56, so that when the gear-wheel turns in one direction the pawl 64 will actuate or engage one of the inner teeth 62 and force the wheel 60 around; but when the gear-wheel 56 is turned in the opposite direction the pawl will merely slip over the opposite teeth and obtain a new hold upon the wheel 60. In order to prevent any back movement of the wheel 60, a spring-pawl 65 is arranged upon the inner surface of the casing 57, so as to come into contact with the teeth 63. This will permit the wheel 60 to be drawn in one direction by the pawl 64, but will prevent its being turned backwardly again upon the opposite movement of the gear-wheels 56. The shaft 59 also carries a series of indicating-disks, as 65 65, which are connected and operated by each other in the same manner as the indicating-disks of an ordinary bicycle-cyclometer. This forms no novel feature of the present invention, and therefore need not be explained further. The figures upon the peripheries of the said disks 65 are arranged opposite the opening 66 in the casing 57, so that the figures will show there and can be read from the outside. The figures are also arranged upon the periphery of the wheel 60 and show through an opening 67, formed in the said casing. The indications upon this wheel are adapted to indicate measurements of smaller quanties, while the indices on the wheel 65 are adapted to keep an account of the aggregate liquid dispensed.

From the above description it will be apparent that by the use of my improved pump I am enabled to pump liquids from different receptacles and from different distances and that I can accurately measure the quantity of liquid discharged, as well as keep a record of the quantity of liquid pumped from time to time. The parts are simple in construction and easy of manipulation and form a structure which will be found very valuable in handling large amounts of liquid.

Having now described my invention, what I claim as new, and desire to secure by Letters Patent, is—

1. A pump comprising a casing, a piston moving therein, means for connecting the pump with liquid-receptacles, a piston-rod on the said piston having a rack, formed thereon, a segmental gear engaging the said rack, a crank for operating the same, projections formed upon the said gear and a lever or bolt adapted to be operated in the path of the said projections for limiting the movement of the segment and controlling the amount of liquid pumped, substantially as described.

2. In a pump, the combination with a cylinder and a piston moving therein, a piston-rod having a rack formed thereon, a segment adapted to engage the teeth of the said rack, laterally-extending projections or lugs formed upon the side of the segment, the said lugs being arranged at different radial distances from the center of motion of the segment and at different distances from one edge of the said segment, a lever pivoted upon the top of the pump and having its end extending into close proximity to the side of the segment, the structure being such that the end of the lever may be brought opposite any one of the segments for limiting its movement and thereby controlling the amount of liquid pumped, substantially as described.

3. A pump for dispensing liquids comprising a cylinder and piston, a base-plate closing the end thereof and having a series of openings formed therein, means connecting the said openings with different liquid-containing tanks and means within the cylinder for closing all of the said openings in the base except the one through which the liquid is to be pumped, substantially as described.

4. A pump for dispensing liquids comprising a cylinder and a piston, a base-plate having a series of openings adapted to be connected with different tanks or liquid-containing vessels, a revoluble plate mounted upon the said base and having an opening formed therein, means for turning the said plate so as to bring the said opening opposite any one of the openings in the base-plate whereby the liquid will be pumped only from the desired receptacle, substantially as described.

5. A pump comprising a casing and a piston, a base-plate mounted therein having a series of openings, suction-pipes connecting each of the said openings with a liquid-containing tank, a plate or disk mounted inside the pump above the base-plate and having an opening adapted to be brought in coincidence with the openings in the base-plate, a gear connected to the base-plate, an operating gear-wheel mounted therein, and hand-operated means connected with the gear-wheel whereby the opening in the revoluble plate may be brought opposite any one of the suction-pipes desired, substantially as described.

6. A dispensing-pump comprising a casing, means for supporting the casing at any desired point comprising attaching-lugs adapted to be bolted or screwed to a support, means for connecting the pump with liquid-tanks at different distances comprising suction-pipes leading to separate tanks, tanks for receiving the ends of the said suction-pipes, said tanks having inlet-openings, air-inlet openings also secured on the tanks, valves at the ends of the suction-pipes for preventing the liquid from flowing back into the tanks, the ends of the tanks adjacent to the pump being opposite a series of openings formed in the end of the pump-cylinder, and a revoluble plate mounted in the said cylinder and means for operating the same whereby only one of the suction-pipes will be opened at a time, substantially as described.

7. A dispensing-pump comprising a cylinder, a casing formed upon the cylinder provided with a plurality of nozzles circularly arranged, a revoluble ring mounted upon said casing having a single opening, a beveled gear on said ring, a horizontal shaft, a beveled gear on the inner end of the said shaft engaging the gear of the ring, an index-wheel on the end of the horizontal shaft, and a pointer on the casing, whereby any of the different nozzles may be brought opposite the single opening by turning the index-wheel, substantially as described.

8. A pump for dispensing liquids comprising a cylinder, a piston moving therein, means for connecting the cylinder with liquid-holding tanks, a dispensing-nozzle comprising a casing formed upon the cylinder of the pump, a valve mounted therein, a ring revolubly mounted on the said casing and carrying nozzles or spouts of different sizes and a clamping means interposed between the ring and the said casing whereby nozzles of different sizes may be clamped opposite the discharge-opening for delivering the liquids pumped into the different-sized receptacles, substantially as described.

9. A liquid-dispensing pump comprising a cylinder and a piston moving therein, one or more suction-pipes leading to a pump, a discharge-nozzle comprising a casing having a guideway formed upon it, a revoluble ring mounted in the guideway and carrying a series of nozzles, screw-threaded extensions interposed between the ring and the nozzle-casing, an oppositely-threaded sleeve engaging the said projections, the structure being such that by operating the said sleeve the ring may be clamped so as to hold any one of the nozzles opposite the discharge-opening of the pump, substantially as described.

10. A dispensing-pump comprising a cylinder, a piston moving therein, a discharge-nozzle comprising a casing having a valve mounted therein, a ring arranged around the said casing carrying different-sized nozzles, a hollow extension formed on the casing adapted to coincide with a hollow extension on the ring, a sleeve for connecting the two whereby the ring may be clamped in different positions and a valve or cock controlling the passage through the hollow extensions, the structure being such that when it is desired to clean the casing, the valve may be opened so that the pump may draw in air and then closed so that the pump may force the air outwardly through the valve-casing for cleaning the same, substantially as described.

11. A pump comprising a cylinder, a rack-piston moving therein, stops for regulating the pumping stroke of the piston so as to control the amount of liquid pumped, a register for recording the quantity of liquid passing through the pump, comprising a gear-wheel mounted in a suitable casing, a second rack upon the pump-piston for operating the gear-wheel, a ratchet-wheel actuated by the gear-wheel, pawls for controlling the operation of the ratchet-wheel, and indicating-disks operated by the said ratchet-wheel for showing the quantity of liquid pumped, substantially as described.

12. A pump comprising a cylinder, a piston moving therein, a piston-rod for operating the piston having a rack formed thereon, a segment for operating the piston and meshing with the said rack, a crank for operating the segment, the said crank being formed in two parts, one part extending within the other, a set-screw upon the outer part adapted to engage recesses or notches formed upon the inner part, the structure being such that by putting the set-screw in different notches, the leverage of the crank may be modified, substantially as described.

In testimony whereof I hereunto affix my signature in presence of two witnesses.

CHARLES W. CRAMER.

Witnesses:
H. C. HAAK,
A. P. BROWN.